US007314008B2

(12) United States Patent
Li

(10) Patent No.: US 7,314,008 B2
(45) Date of Patent: Jan. 1, 2008

(54) SUSPENDING-RAIL AND DUAL-ATTRACTION BALANCING COMPENSATION TYPE PERMANENT MAGNETIC LEVITATION TRAIN AND RAILWAY SYSTEM

(76) Inventor: Lingqun Li, 3-102, 3B, Jinhairenjin, No.58 Qingahi Road, Jinshitondujiaqu, Dalian City, 116650 (CN)

( * ) Notice: Subject to any disclaimer, the term of this patent is extended or adjusted under 35 U.S.C. 154(b) by 291 days.

(21) Appl. No.: 11/102,536

(22) Filed: Apr. 8, 2005

(65) Prior Publication Data

US 2005/0223934 A1 Oct. 13, 2005

(30) Foreign Application Priority Data

Apr. 9, 2004 (CN) .......................... 2004 1 0032561

(51) Int. Cl.
*B60L 13/04* (2006.01)
(52) U.S. Cl. ..................................... 104/281
(58) Field of Classification Search ............... 104/281, 104/282, 283, 285
See application file for complete search history.

(56) References Cited

U.S. PATENT DOCUMENTS

| | | | | |
|---|---|---|---|---|
| 6,357,359 | B1 * | 3/2002 | Davey et al. ............... | 104/282 |
| 6,510,799 | B2 | 1/2003 | Lamb et al. | |
| 6,899,036 | B2 | 5/2005 | Lamb et al. | |
| 7,134,396 | B2 * | 11/2006 | Ramu ........................... | 105/49 |
| 2003/0205163 | A1 | 11/2003 | Lamb et al. | |

FOREIGN PATENT DOCUMENTS

CN 1264660 A 8/2000

CN 1557650 A 1/2004

OTHER PUBLICATIONS

"Magnetic Levitation Railway System and Technique"; Wei Qingchai & Kong Youngjian, *China Science and Technology Publishing Company*, Nov. 2003, 5pgs.

* cited by examiner

*Primary Examiner*—S. Joseph Morano
*Assistant Examiner*—Robert J. McCarry, Jr.
(74) *Attorney, Agent, or Firm*—Hunton & Williams LLP

(57) ABSTRACT

A suspending-rail and dual-attraction balancing compensation type permanent magnetic levitation train and railway system, comprising a track unit and magnetic levitation vehicles, the track unit including goalposts, inverted T-shaped gate beams, flanged beams made which are integrally formed by molding reinforced concrete so as to form a portal frame and suspending rails suspended from and fixed to flanged beams and each formed as an arch steel crosstie, both ends of each flanged beams being mounted on the inverted T-shaped gate beams in a lap joint manner respectively, a magnetically conductive plate rail with a guide rail in the form of a groove at a center portion thereof being provided to a top inner surface of the arch crosstie and a magnetically conductive wing rail being provided to each inner side surface of the arch crosstie; each magnetic levitation vehicle including an upper power cabin and a lower car which are formed integrally, the magnetic levitation power cabin being inlaid and mounted in the arch crosstie, a top permanent magnet base plate on which a top permanent magnet is provided being mounted on a top outer surface of the magnetic levitation power cabin, and two wing permanent magnets being provided at each of outer side surfaces of the magnetic levitation power cabin, power units being mounted inside the magnetic levitation power cabin, and two sets of guiding fixed pulleys being mounted on both ends inside the magnetic levitation power cabin.

7 Claims, 6 Drawing Sheets

SUSPENDING-RAIL AND DUAL-ATTRACTION BALANCING COMPENSATION TYPE PERMANENT MAGNETIC LEVITATION TRAIN AND RAILWAY SYSTEM

TECHNICAL FIELD OF THE INVENTION

The present invention relates to a permanent magnetic levitation train and railway system, more particularly, to a dual-attraction balancing compensation type permanent magnetic levitation train and railway system in which suspending rails are elevated and the train is suspended from and travels under the suspending rails.

BACKGROUND ART OF THE INVENTION

The magnetic levitation technique has been rapidly and significantly developed in recent years, for example, the German TR serial "ordinary conductive" type electromagnetic levitation train system is driven by linear motors and travel speed thereof can reach 450 km/h. With such electromagnetic levitation train system, the roadbed is required to be elevated and the bottom portion of the train is held above the rails so as to prevent the train from derailment or overturning. The Japan MLX serial "super-conductive" type magnetic levitation train system requires low temperature super-conductive coils for generating strong magnetic field force, and the train travels in a U-shaped groove. Current-conducting rings in the shape of numeral "8" are mounted on the side walls of the U-shaped groove at predetermined intervals so as to guide the train and function as inductive magnetic coils to generate levitation force for levitating the train. Travel speed of the Japan MLX serial "super-conductive" magnetic levitation train can reach 550 km/h. The China GKC06 serial "permanent magnetic" type levitation train system employs permanent magnetic compensation levitation technique and is driven by linear motors, and the speed thereof can reach 1080 km/h. The above techniques are referred to "*Magnetic Levitation Railway System and Technique*" (China Science and Technology Publishing Company, published on November, 2003) and the Chinese Patent Publishing No. CN1264660A entitled "tube vacuum permanent magnetic compensation type levitation train-elevated railway-station system".

The German TR serial magnetic levitation train system and the Japan MLX serial magnetic levitation train system both have a "horizontal rail type" arrangement. As such, center of gravity of the train is high. Accordingly, stability of the train is degraded. With electromagnetic and super-conductive permanent magnetic levitation structure and the liner motor driving, the manufacturing cost of these types of magnetic levitation train system is high. The German TR serial magnetic levitation train system employed in Shanghai costs about 36.5 million US dollars per kilometer. The Japan MLX serial magnetic levitation train system costs about 82.9 million US dollars per kilometer, thus limiting the use of this technique. The China GKC06 magnetic levitation train system is advantageous in stabilizing center of gravity of the train, reducing manufacture cost and saving energy; however, expensive neodymium iron boron rail magnets are required to be provided along the magnetic railways.

SUMMARY OF THE INVENTION

An object of the present invention is to provide a suspending-rail and dual-attraction balancing compensation type permanent magnetic levitation train and railway system, which does not need neodymium iron boron rail magnet, is low in cost, high in transport capacity and compatibility, and the speeds with the magnetic levitation train of the present invention can reach 600 km/h, so that the suspending-rail and dual-attraction balancing compensation type permanent magnetic levitation train and railway system can be used widely.

The present invention provides a suspending-rail and dual-attraction balancing compensation type permanent magnetic levitation train and railway system, comprising: a track unit including goalposts, inverted T-shaped gate beams, flanged beams made by molding reinforced concrete, and suspending rails, in which two goalposts and one inverted T-shaped gate beam being integrally formed by molding reinforced concrete so as to form a portal frame, both ends of each of flanged beams being mounted on the inverted T-shaped gate beams in a lap joint manner respectively, the suspending rails being suspended from and fixed to flanged beams, each suspending rail being formed as an arch crosstie which is made of steel and in the shape of "∩", and a magnetically conductive plate rail being provided to a top inner surface of the arch crosstie and a magnetically conductive wing rail being provided to each inner side surface of the arch crosstie, the magnetically conductive wing rail being provided with a guide rail in form of a groove at a center portion thereof; a magnetic levitation train consisting of magnetic levitation vehicles which are connected to one another sequentially, each magnetic levitation vehicle including an upper power cabin and a lower portion which are formed integrally, the magnetic levitation power cabin being inlaid and mounted in the arch crosstie, in which a top permanent magnet base plate on which a top permanent magnet is provided being mounted on a top outer surface of the magnetic levitation power cabin, and two wing permanent magnets, i.e. an upper wing permanent magnet and a lower wing permanent magnet which are spaced by a gap there between, being provided at each of outer side surfaces of the magnetic levitation power cabin, one of the two wing permanent magnets being N pole and the other being S pole, and in which power units which are each consisting of a driving wheel, a driving motor, a vehicle-mounted electrical source and an inversion control system, being mounted inside the magnetic levitation power cabin, and two sets of guiding fixed pulleys being mounted on both ends inside the magnetic levitation power cabin, the top permanent magnet provided on the top outer surface of the magnetic levitation power cabin and the magnetically conductive plate rail fixed to the top inner surface of the arch crosstie being 20 to 160 mm apart so as to generate a levitation force whose direction is contrary to the gravity direction, and the corresponding wing permanent magnet and the magnetically conductive wing rail being 5 to 35 mm apart so as to generate an upward and downward balancing levitation force, and during travel of the magnetic levitation vehicles, the train consisting of the vehicles being in a levitation state under the levitation force and the upward and downward balancing levitation force, and the guiding fixed pulley and the driving wheel being level with each other and all contacted with the guide rails provided at inner side surfaces of the arch crosstie so as to control centrally the train between the two magnetically conductive wing rails.

Further, a temperature compensation gap is provided between the end of the flanged beam and the inverted T-shaped gate beam.

Preferably, the flanged beams are provided with vent holes at central portions thereof.

In addition, the magnetically conductive plate rail and magnetically conductive wing rail are all made of ferromagnetic steel plate.

Preferably, slide shoes are provided under and mounted to both ends of the top permanent magnet base plate.

Further, the lower portion of each magnetic levitation vehicle is used as a lower passenger cabin or a lower cargo cabin.

Preferably, each magnetic levitation vehicle is manufactured by using alloys or glass fibre reinforced plastic and has a streamlined shape.

DETAILED DESCRIPTION OF THE PREFERRED EMBODIMENTS OF THE INVENTION

Embodiments of the magnetic levitation train and railway system according to the present invention will be described in detail with reference to the drawings. The detailed description of the embodiments is intended to explain the present invention rather than limit the scope defined by the present invention.

Figure 1:
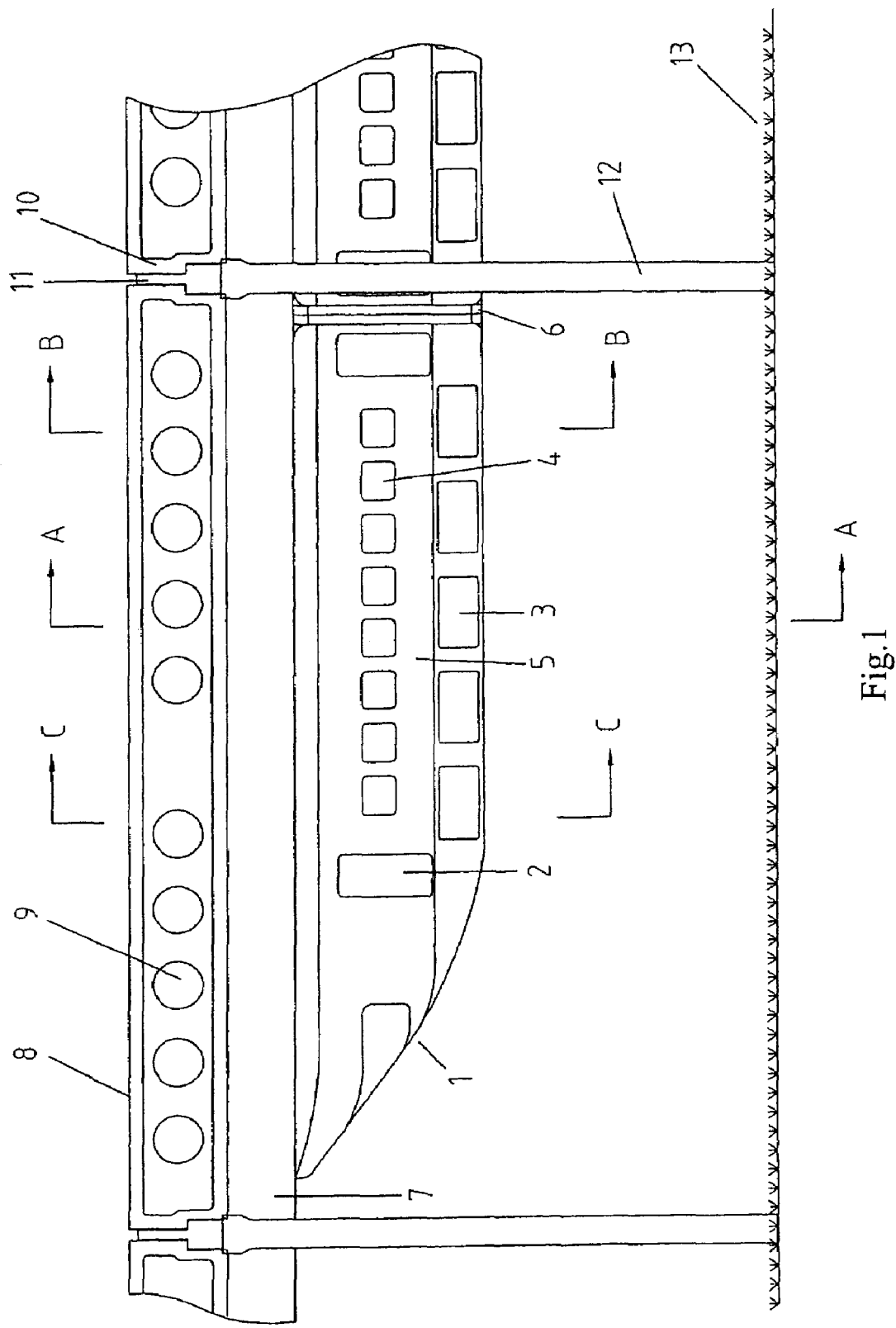
FIG. 1 is a side view showing an overall appearance of the magnetic levitation train and railway system according to the present invention.

FIG. 1 is a side view showing an overall appearance of the magnetic levitation train and railway system according to the present invention. As shown in FIG. 1, the magnetic levitation train and railway system according to the present invention comprises a track unit, and a magnetic levitation train which is composed of magnetic levitation vehicles 15 connected to one another sequentially. A head vehicle 1 of the train is streamlined and the streamlined surface faces downwardly; each vehicle 15 is provided with doors 2, windows 4, luggage cabin doors 3 and an envelope 5 covering the body of the vehicle 15; contacting portions between the envelope 5 and the doors 2, windows 4, and luggage cabin doors 3 are flattened and smoothened, and connecting portions 6 between adjacent vehicles are also flattened and smoothened, so that wind resistance can be reduced during the travel of the train. The vehicles 15 of the train are suspended from the track unit, and preferably the ground below the magnetic levitation train and railway system is covered by lawn 13 for greening, and a distance between the bottom of the train and the lawn 13 is about 6 meters.

Figure 2:
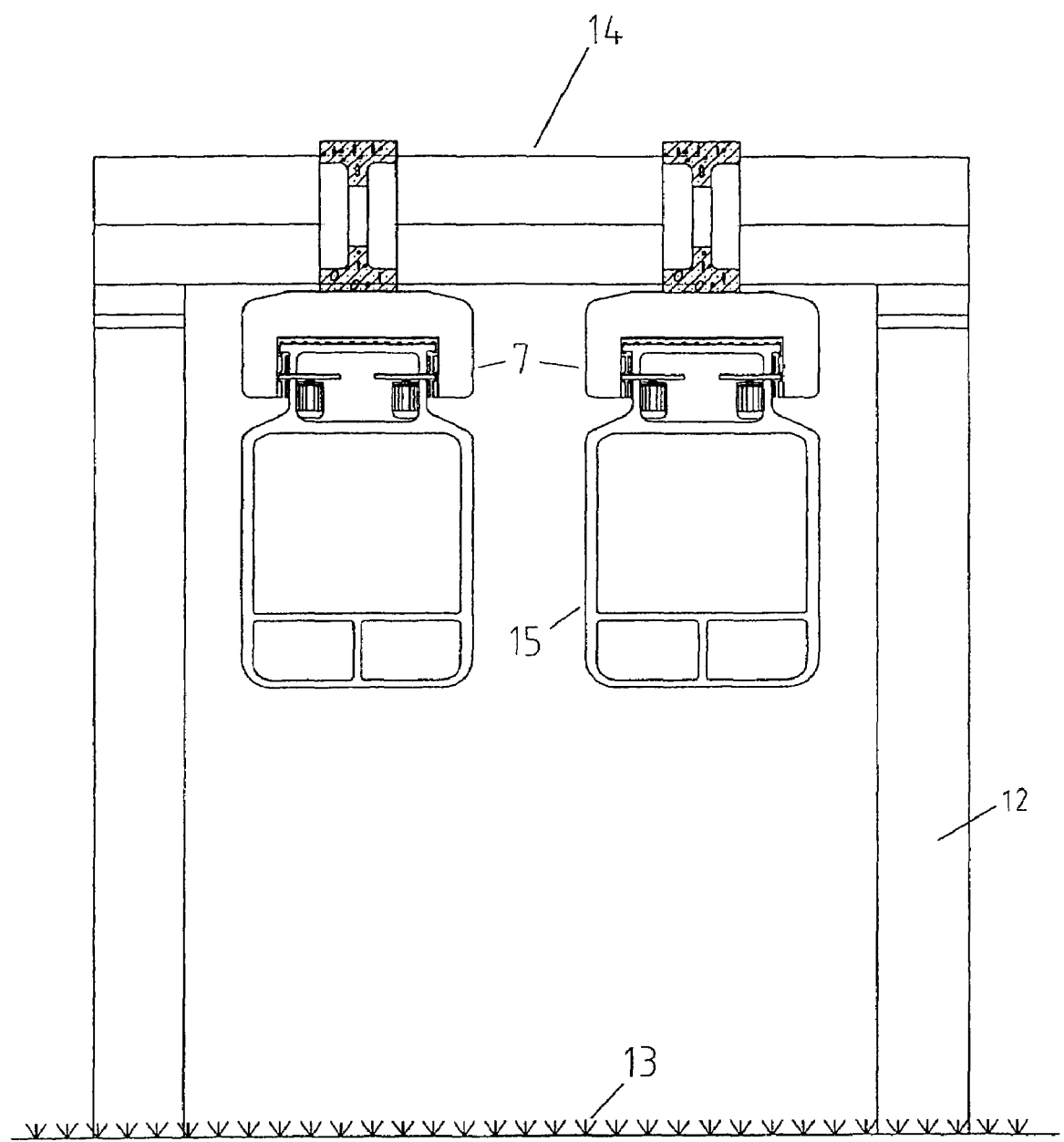
FIG. 2 is a schematic sectional view taken along line A-A in FIG. 1.
Figure 3:
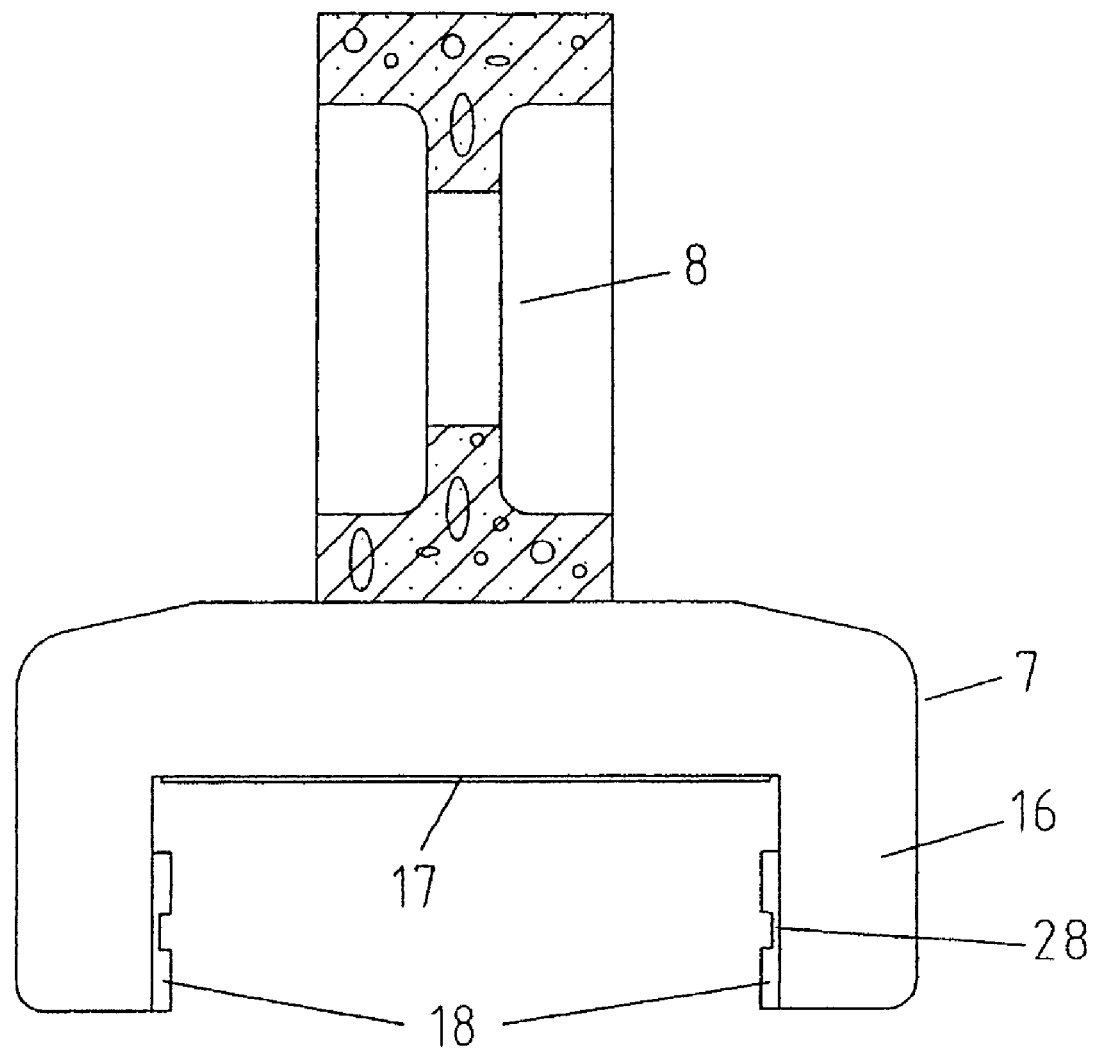
FIG. 3 is a schematic sectional view of a suspending rail according to the present invention.

As shown in FIGS. 2 and 3, suspending rails 7 are provided above the train and fixed to flanged beams 8, respectively. Flanged beams 8 are made of pre-stressed reinforced concrete and provided with vent holes 9 for reducing wind pressure. Each end 10 of the flanged beam 8 is mounted on an inverted T-shaped gate beam 11 in a lap joint manner. A temperature compensation gap is provided between the end 10 of the flanged beam 8 and the inverted T-shaped gate beam 11, and the end 10 and the inverted T-shaped gate beam 11 are connected to each other by screws. The inverted T-shaped gate beam 11 and goalposts 12 are molded integrally by using concrete so as to form a portal frame 14, and two suspending rails 7 are fixed to the portal frame 14. With this multiple-rails technique, the time interval between the departure of a train in one direction can be reduced and transport capacity can be significantly increased. Each of suspending rails 7 is formed as an arch crosstie 16 which is made of steel and in the shape of "∩" (that is, an inverted letter U). A magnetically conductive plate rail 17 made of ferromagnetic steel plate is fixed to a top inner surface of the arch crosstie 16 by means of screws, and a magnetically conductive wing rail 18 is fixed to each inner side surface of the arch crosstie 16 by means of screws and provided with a groove at a center portion thereof. The groove of the conductive wing rail 18 is used as a guide rail 28.

Figure 4:
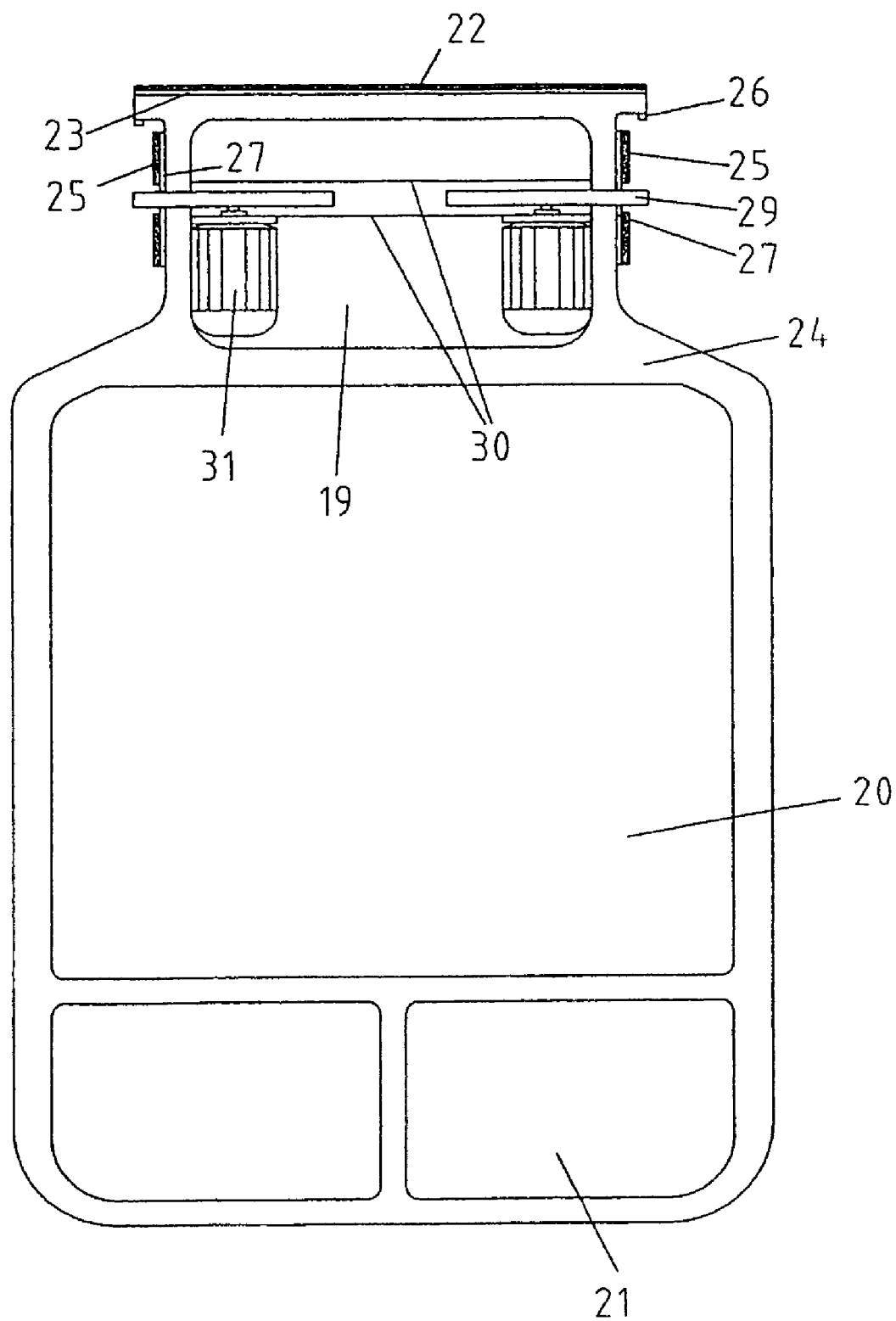
FIG. 4 is a schematic sectional view of a magnetic levitation vehicle according to the present invention.
Figure 5:
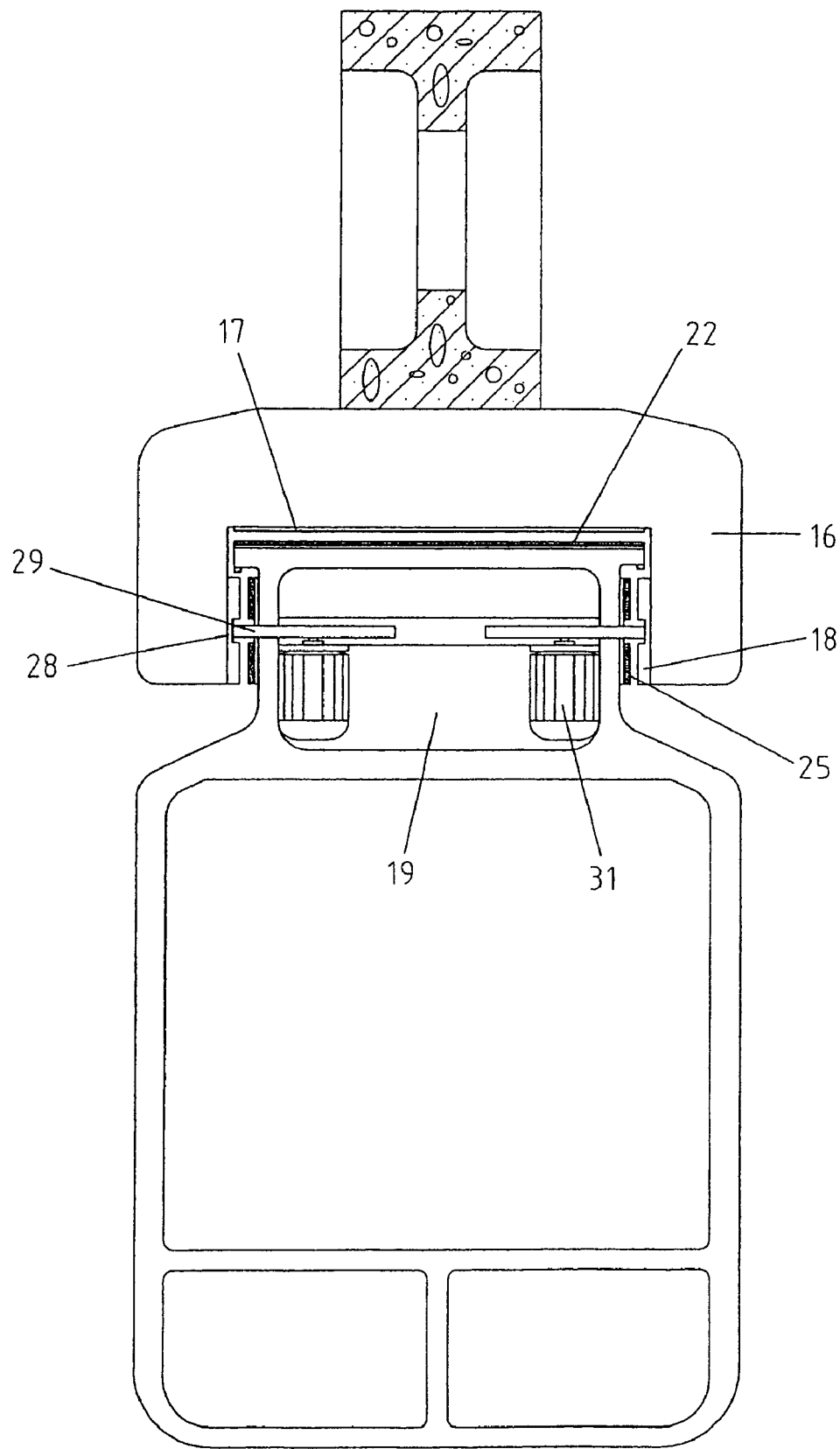
FIG. 5 is a schematic sectional view taken along line B-B in FIG. 1, showing the engagement relationship between the magnetic levitation vehicle and the track unit according to the present invention.

FIG. 4 is schematic sectional view of a magnetic levitation vehicle according to the present invention and FIG. 5 is a schematic sectional view taken along line B-B in FIG. 1, showing the engagement relationship between the magnetic levitation vehicle and the track unit according to the present invention. As shown in FIG. 4 and FIG. 5, the magnetic levitation vehicle according to the present invention is manufactured integrally by using alloys or glass fibre reinforced plastic and comprises an upper power cabin 19 and a lower portion, i.e. a car, in which the lower portion can be used as a lower passenger cabin. The lower passenger cabin can be substituted by a lower cargo cabin or divided into two parts, i.e. a passenger cabin 20 and a lower cargo cabin 21. The magnetic levitation power cabin 19 is inlaid and mounted in the arch crosstie 16, and power units are mounted inside the magnetic levitation power cabin 19 and fixed to a wheel beam 30. Each power unit comprises a driving wheel 29 and a driving motor 31 coupled coaxially with each other.

A top permanent magnet 22 is provided on a top outer surface of the magnetic levitation power cabin 19, and fixed to an annular keel 24 of the magnetic levitation power cabin 19 through a top permanent magnet base plate 23 by means of screws. A slide shoe 26 is provided under and mounted to each end of the top permanent magnet base plate 23. Two wing permanent magnets 25, i.e. an upper wing permanent magnet and a lower wing permanent magnet, are provided at each of outer side surfaces of the magnetic levitation power cabin 19 in which one of the two wing permanent magnets 25 is N pole and the other is S pole. The wing permanent magnets 25 are fixed to the annular keel 24 of the magnetic levitation power cabin 19 through a wing permanent magnet base plate 27 by means of screws.

The top permanent magnet 22 provided on the top outer surface of the magnetic levitation power cabin 19 and the magnetically conductive plate rail 17 fixed to the top inner surface of the arch crosstie 16 are spaced by a gap having a width of 20 to 160 mm so as to generate a levitation force whose direction is contrary to the gravity direction. The wing permanent magnets 25 fixed on two outer side surfaces of the magnetic levitation power cabin 19 correspond to the magnetically conductive wing rails 18 fixed to two inner side surfaces of the arch crosstie 16 respectively, and the corresponding wing permanent magnet 25 and the magnetically conductive wing rail 18 are spaced by a gap having a width of 5 to 35 mm so as to generate a balancing levitation force for balancing the vehicles 15 of the train in a vertical direction, thus maintaining the vehicles 15 of the train at a predetermined level.

When the wing permanent magnet 25 is level with the magnetically conductive wing rail 18, that is, the levitation force generated between the top permanent magnet 22 and the magnetically conductive plate rail 17 is equal to the gravity of the vehicle but the direction thereof is contrary to the gravity direction, no acting force is generated between the corresponding wing permanent magnet 25 and the magnetically conductive wing rail 18 in the gravity direction. Accordingly, this level of the wing permanent magnet 25 and the magnetically conductive wing rail 18 is referred as a balance point level. When the level of the wing permanent magnet 25 is above that of the corresponding magnetically conductive wing rail 18, that is, the wing permanent magnet 25 is above the balance point level, the levitation force generated between the top permanent magnet 22 and the magnetically conductive plate rail 17 is greater than the gravity of the vehicle 15. As a result, a downward acting force is generated between the corresponding wing permanent magnet 25 and the magnetically conductive wing rail 18 in the gravity direction, and the direction of the downward acting force is contrary to that of the levitation force generated between the top permanent magnet 22 and magnetically conductive plate rail 17, so that the downward acting force will cause the vehicle 15 to move downwardly to the balance point level, and the downward acting force becomes zero when the vehicle 15 reaches the balance point level. On the other hand, when the level of the wing permanent magnet 25 is below that of the corresponding magnetically conductive wing rail 18, that is, the wing permanent magnet 25 is below the balance point level, the gravity of the vehicle 15 is greater than the levitation force generated between the top permanent magnet 22 and the magnetically conductive plate rail 17. Then, an upward acting force is generated between the corresponding wing permanent magnet 25 and the magnetically conductive wing rail 18 in a direction contrary to the gravity direction, that is, the direction of the upward acting force is identical with that of the levitation force generated between the top permanent magnet 22 and magnetically conductive plate rail 17 and contrary to that of the gravity direction, so that the upward acting force will cause the vehicle to move upwardly to the balance point level, and the upward acting force becomes zero when the vehicle 15 reaches the balance point level.

In other words, the top permanent magnet 22 and the magnetically conductive plate rail 17 located above the top permanent magnet 22 constitute a levitation mechanism generating a levitation force in the upward direction so as to levitate the train. In addition, the wing permanent magnet 25 and the magnetically conductive wing rail 18 generate an upward and downward balancing levitation force, and the upward levitation force cooperates with the balancing levitation force so as to achieve a "dual-attraction balancing compensation type levitation", thus maintaining the vehicles 15 of the train at a predetermined level. If failure of the levitation forces occurs, the vehicles 15 can still travel on the top of the magnetically conductive wing rail 18 by means of the slide shoes 26 so as to ensure safety of the train system.

The conventional electric locomotive is mounted with driving wheels at both ends thereof, and the driving wheels are used to drive, guide and support the electric locomotive during the reciprocating movement of the electric locomotive. However, adding one set of driving wheels will increase the cost and the weight of the electric locomotive, and the greater the weight of the electric locomotive is, the more energy the electric locomotive consumes. The present invention improves the above power and guide unit of the conventional electric locomotive. More specifically, in the present invention, the guide unit is mounted in the middle of the vehicle, and fixed pulleys provided at both ends of the vehicle are used as guide mechanism. With the above construction, the manufacture cost and weight of the vehicle can be reduced greatly.

In the present invention, a set of guide fixed pulleys 32 are mounted at each end of the magnetic levitation power cabin 19 and fixed to the wheel beam 30. The guide fixed pulley 32 and the driving wheel 29 are level with each other and all contacted with the guide rails 28 formed at inner side surfaces of the arch crosstie 16 for controlling the freedom degree of the magnetic levitation power cabin 19 in left and right directions, so that the vehicles can be controlled to be positioned at the center between the two magnetically conductive wing rails 18. During travel of the magnetic levitation vehicles, the magnetic levitation vehicles are in a levitation state under the levitation force generated between the top permanent magnet 22 and the magnetically conductive plate rail 17 and the upward and downward balancing levitation force generated between wing permanent magnet 25 and the magnetically conductive wing rail 18, and driving electric motors 31 drive the vehicles to travel through driving wheels 29 while guiding of the vehicles are controlled by the guide fixed pulleys 32.

Figure 6:
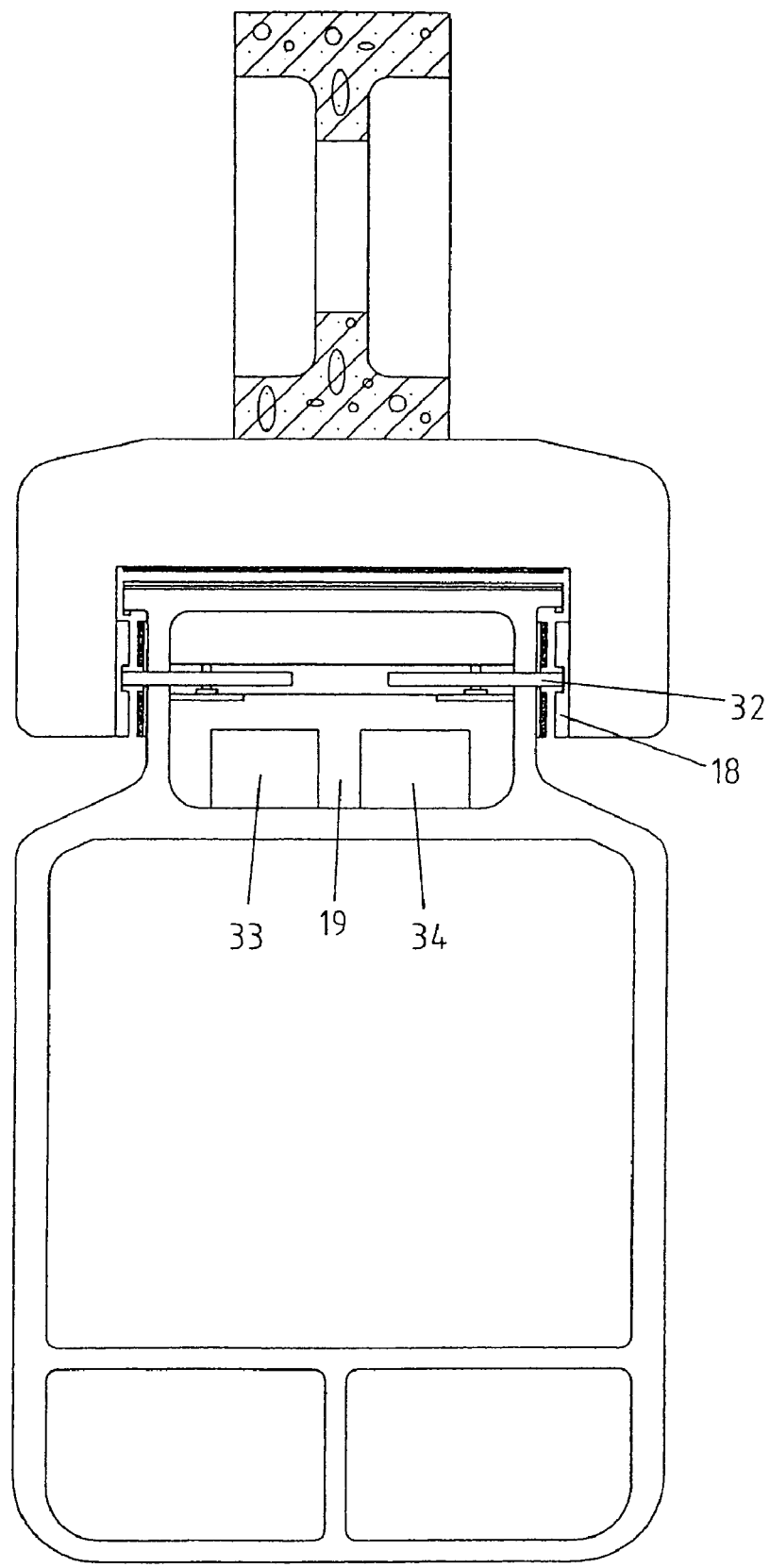
FIG. 6 is a schematic sectional view taken along line C-C in FIG. 1.

FIG. 6 is a schematic sectional view taken along line C-C in FIG. 1. As shown in FIG. 6, the guide fixed pulley 32 are contacted with the guide rails 28 formed at inner side surfaces of the arch crosstie 16. The magnetic levitation power cabin 19 is also provided with a vehicle-mounted electrical power source 33 and an inversion control system 34. Since the vehicle-mounted electrical source 33 and the inversion control system 34 are in common with that used in the conventional electric locomotives and well known in the art. In addition, they are not the emphases of the present invention, therefore, detailed descriptions of the vehicle-mounted electrical source 33 and the inversion control system 34 are omitted.

By comparison to the prior art, the magnetic levitation train and railway system of the present invention has the following advantages: the cost is low and equivalent to ¼ of that of the German TR serial magnetic levitation train system; the energy consumption is low and equivalent to ½ of that of the German TR serial magnetic levitation train system; the transport capacity is high and equivalent to 5 times of that of the German TR serial magnetic levitation train system, and the magnetic levitation train and railway system of the present invention can be used for passenger transportation and cargo transportation; the weight of the magnetic levitation train, i.e. 0.8 T/m, is low, and the weight of the German TR serial magnetic levitation train system is 2.2 T/m; and the specification and capacity of the German TR serial magnetic levitation train system are similar to that of the Japan MLX serial levitation train system.

The foregoing embodiments and advantageous are merely exemplary and are not intended be constructed as limiting the present invention. The present teaching can be readily applied to other types. Also, the description of the embodiment of the present invention is intended to illustrative, and not to limit the scope of the claims, and many alternatives, modifications, and variations will be apparent to those skilled in the art.

What is claimed is:

1. A suspending-rail type permanent magnetic levitation train and railway system, comprising:
   a track unit comprising
      a plurality of portal frames each comprising two supporting posts connected by an inverted T-shaped gate beam, said supporting posts and said gate beam being integrally formed of molded reinforced concrete,
      a plurality of flanged beams formed of molded reinforced concrete, each flanged beam having one end mounted to a first inverted T-shaped gate beam in a lap joint manner and another end mounted to a second inverted T-shaped gate beam,
      a plurality of steel suspending rails, each rail being fixed to a corresponding flanged beam, the suspending rail being formed as an arch crosstie having an inverted U shape, a magnetically conductive plate rail being fixed to a top inner surface of said arch crosstie, magnetically conductive wing rails being fixed to opposing inner side surfaces of said arch crosstie, the magnetically conductive wing rails each defining a guide rail having an inward facing groove,
   a magnetic levitation train consisting of sequentially connected magnetic levitation vehicles, each having an upper power cabin and a lower portion integrally formed with the upper power cabin, said upper power cabin being mounted within said arch crosstie and having
      a top outer surface connecting two side outer surfaces
      a top permanent magnet attached to the top outer surface by a top permanent magnet base plate,
      upper and lower wing permanent magnets attached to each of the side outer surfaces, the upper and lower wing permanent magnets having a gap therebetween, wherein one of the upper and lower wing permanent magnets is an N pole and the other is an S pole,
      a power unit mounted inside the upper power cabin, the power unit comprising a driving wheel, a driving motor, a vehicle-mounted electrical source, and an inversion control system, and two sets of guiding fixed pulleys, one set being mounted at each end of said power cabin,
   wherein said power cabin is configured and disposed so that the top permanent magnet and the magnetically conductive plate rail are spaced apart by a distance in a range of 20-160 millimeters, thereby generating a levitation force in opposition to the force of gravity, and so that the wing permanent magnets and the magnetically conductive wing rails are spaced apart by a distance in a range of 5-35 millimeters, thereby generating an upward and downward balancing levitation force,
   wherein said magnetic levitation vehicles are maintained in a levitation state during travel by said levitation force and said upward and downward balancing levitation force, and
   wherein said guiding fixed pulley and said driving wheel are level with each other and are in contact with said guide rails.

2. The suspending-rail type permanent magnetic levitation train and railway system of claim 1, wherein a temperature compensation gap is provided between the ends of each flanged beam and each inverted T-shaped gate beam.

3. The suspending-rail type permanent magnetic levitation train and railway system of claim 1, wherein each flanged beam contain vent holes within the central portion thereof.

4. The suspending-rail type permanent magnetic levitation train and railway system of claim 1, wherein the magnetically conductive plate rails and the magnetically conductive wing rails are comprised of ferromagnetic steel plate.

5. The suspending-rail type permanent magnetic levitation train and railway system of claim 1, wherein slide shoes are mounted under both ends of the top permanent magnet base plate.

6. The suspending-rail type permanent magnetic levitation train and railway system of claim 1, wherein the lower portion of each magnetic levitation vehicle comprises a lower passenger cabin or a lower cargo cabin.

7. The suspending-rail type permanent magnetic levitation train and railway system of claim 1, wherein each magnetic levitation vehicle has a streamlined shape and is manufactured from alloys or glass fibre-reinforced plastic.

* * * * *